(12) United States Patent  (10) Patent No.: US 7,594,138 B2
Abdulvahid  (45) Date of Patent: Sep. 22, 2009

(54) SYSTEM AND METHOD OF ERROR RECOVERY FOR BACKUP APPLICATIONS

(75) Inventor: Jasmeer Kuppavilakom Abdulvahid, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 398 days.

(21) Appl. No.: 11/669,321

(22) Filed: Jan. 31, 2007

(65) Prior Publication Data

US 2008/0184063 A1    Jul. 31, 2008

(51) Int. Cl.
*G06F 11/00* (2006.01)
(52) U.S. Cl. .......................................................... 714/6
(58) Field of Classification Search .................. 714/2–8, 714/13, 15, 16, 20, 21, 37, 38, 42, 54
See application file for complete search history.

(56) References Cited

U.S. PATENT DOCUMENTS

| | | | |
|---|---|---|---|
| 4,941,087 A * | 7/1990 | Kap ............................ | 710/260 |
| 4,945,474 A | 7/1990 | Elliott et al. | |
| 5,155,678 A | 10/1992 | Fukumoto et al. | |
| 5,274,645 A | 12/1993 | Idleman et al. | |
| 6,092,085 A | 7/2000 | Keene | |
| 6,163,856 A | 12/2000 | Dion et al. | |
| 6,205,449 B1 | 3/2001 | Rastogi et al. | |
| 6,339,793 B1 | 1/2002 | Bostian et al. | |
| 6,349,357 B1 | 2/2002 | Chong, Jr. | |
| 6,397,229 B1 * | 5/2002 | Menon et al. ............... | 707/204 |
| 6,629,263 B1 | 9/2003 | Sassi | |
| 6,658,590 B1 | 12/2003 | Sicola et al. | |
| 6,721,901 B1 | 4/2004 | McBrearty et al. | |
| 6,826,613 B1 | 11/2004 | Wang et al. | |
| 7,054,960 B1 | 5/2006 | Bezbaruah et al. | |
| 7,146,387 B1 * | 12/2006 | Russo et al. ................. | 707/204 |
| 7,346,905 B2 * | 3/2008 | Dorrance et al. ............ | 718/104 |
| 2002/0163910 A1 | 11/2002 | Wisner et al. | |

(Continued)

FOREIGN PATENT DOCUMENTS

CA    2419883 A1    8/2004

(Continued)

OTHER PUBLICATIONS

Flynn, Jr. et al., "System and Method for Application Fault Tolerance and Recovery Using Topologically Remotely Located Computing Devices", U.S. Appl. No. 11/403,050, filed Apr. 12, 2006.

(Continued)

*Primary Examiner*—Nadeem Iqbal
(74) *Attorney, Agent, or Firm*—Stephen J. Walder, Jr.; Randall J. Bluestone

(57) ABSTRACT

A system and method of error recovery for backup applications that utilizes error recovery logic provided in the storage controller itself are provided. With the system and method, error recovery logic is provided in the storage controller for generating and maintaining error recovery logs for one or more backup operations of one or more backup applications running on one or more host systems. The backup applications may utilize an established set of commands/API function calls to invoke the error recovery logic on the storage controller. At the initiation of the backup operation, the storage controller assigns a unique identifier to the backup operation and returns this identifier to the backup application. The backup application may then use this identifier to initiate error recovery operations or commit changes made during the backup operation via the storage controller. Thus, the storage controller offloads the burden of error recovery from the backup applications.

35 Claims, 4 Drawing Sheets

U.S. PATENT DOCUMENTS

| | | | |
|---|---|---|---|
| 2003/0036882 A1 | 2/2003 | Harper et al. | |
| 2004/0064639 A1 | 4/2004 | Sicola et al. | |
| 2004/0064659 A1 | 4/2004 | Achiwa et al. | |
| 2004/0111720 A1 | 6/2004 | Vertes | |
| 2005/0021836 A1 | 1/2005 | Reed et al. | |
| 2005/0071380 A1 | 3/2005 | Micka et al. | |
| 2005/0081091 A1 | 4/2005 | Bartfai et al. | |
| 2005/0099963 A1 | 5/2005 | Multer et al. | |
| 2005/0108470 A1 | 5/2005 | Gold et al. | |
| 2005/0160315 A1 | 7/2005 | Chandrasekaran et al. | |
| 2005/0251785 A1 | 11/2005 | Vertes et al. | |
| 2005/0262411 A1 | 11/2005 | Vertes et al. | |
| 2005/0262483 A1 | 11/2005 | Laird | |
| 2006/0015770 A1 | 1/2006 | Dicorpo et al. | |
| 2007/0033361 A1* | 2/2007 | Abdulvahid et al. | 711/165 |
| 2007/0214196 A1* | 9/2007 | Garimella et al. | 707/204 |

FOREIGN PATENT DOCUMENTS

| | | | |
|---|---|---|---|
| JP | | 2001034568 A | 2/2001 |

OTHER PUBLICATIONS

Flynn, Jr. et al., "System and Method for Relocating Running Applications to Topologically Remotely Located Computing Systems", U.S. Appl. No. 11/340,813, filed Jan. 25, 2006.

"VMware VMotion", VMware, Inc., http://www.vmware.com/products/vc/vmotion.html, 2 pages.

"Meiosys Relocates Multi-Tier Applications Without Interruption of Service", PR Newswire, http://www.prnewswire.com/cgi-bin/stories.pl?ACCT=104&STORY=/www/story/11-23-20..., 2 pages.

Warrick et al., "IBM, TotalStorage PPRC Migration Manager and FlashCopy Manager Overview", Redbooks, IBM Corporation, 2005, ibm.com/redbooks, pp. 1-26.

Castets et al., "IBM TotalStorage Enterprise Storage Server PPRC Extended Distance", Redbooks, IBM Corporation, Jun. 2002, ibm.com/redbooks, 184 pages.

"Meiosys breaks technology barrier for cost-effective fault tolerance technology designed to be embedded in OEM platform solutions", Primeur Monthly, http://www.hoise.com/primeur/05/articles/monthly/AE-PR-05-05-46.html, 10 pages.

"Meiosys Releases MetaCluster UC Version 3.0", PR Newswire, http://www.prnewswire.com/cgi-bin/stories.pl?ACCT=109&STORY=/www/story/01-24-20..., 4 pages.

Rougier, Marc, "Non-intrusive Middleware for Continuity of Service: Protection Against System Failures", 47th Meeting of IFIP WG10.4, Puerto Rico, Jan. 2005, www2.Iaas.fr/IFIPWG/Workshops& Meetings/47/WS/04-Rougier.pdf, 23 pages.

* cited by examiner

SYSTEM AND METHOD OF ERROR RECOVERY FOR BACKUP APPLICATIONS

BACKGROUND

1. Technical Field

The present application relates generally to an improved data processing system and method. More specifically, the present application is directed to a system and method of error recovery for backup applications.

2. Description of Related Art

Modern storage controllers have several copy service features, such as point-in-time copy, e.g., FlashCopy, synchronous and asynchronous controller-to-controller remote copy, and the like. The rationale behind having these features in storage controllers is to relieve the application and/or data servers of the burden of creating backup copies of the data volumes. Creation of backup copies of data volume using storage copy services have to be synchronized with the operation system and application activities to ensure the integrity and consistency of the copies.

Several database applications, such as DB2 and Oracle, have well defined hooks to synchronize the creation of backup volumes using copy services. This is achieved usually by executing a set of commands to flush the application buffers to the disk and put the application in back up mode thereby providing a window for the backup client or the operator to trigger the copy services operations necessary to generate hardware copy. Recently, vendors have integrated similar framework into the operating system itself to achieve greater consistency of the copy. Microsoft's Volume Shadow copy Service (VSS) for Windows 2003 is one such framework.

Taking a consistent copy of a set of source volumes using copy services of the storage controllers is a complex task and involves several interactions with storage controllers. In some situations, such as with VSS for example, the copies, once created, will have to be attached to the client machine so that a backup application can transfer the data on to a tape device for permanent storage. After that transfer the copies have to be detached from the host. This attaching and detaching of volumes requires additional interactions with the storage controller. Moreover, these operations have to be repeated for every data volume and, since modern client machines typically have several data volumes, such operations create a large overhead.

For example, a typical storage controller that supports point-in-time copies, performs the following series of operations:

1) collect details of the source volume(s);
2) create or select target volume(s) for the copy;
3) create special objects, such as consistency groups, within the storage controller(s) in order to guarantee the consistency of the copy;
4) create a point-in-time copy object in the storage controller for each source volume;
5) prepare the source volume(s) for copying;
6) create the copy when the operating system and/or the application are in a consistent state;
7) attach the copy to the client machine if needed by the framework/application;
8) start copying the data from the copy to tape if necessary;
9) detach the target volume from the client machine when step 8 is complete;
10) remove all of the special copy services objects, such as the point-in-time copy objects and consistency objects created for this backup operation from the storage controller; and
11) remove the copy and reclaim the space if the backup was not for long term preservation, such as one used just to transfer the consistent data to another medium, e.g., tape.

Each of the operations listed above, with the exception of operation 8 above, requires one or more interactions with the storage controller. Moreover, the above operations need to be repeated for each source volume since storage controller commands are operated upon one volume at a time.

In short, taking a backup of a system using copy services is a complex procedure that is difficult, if not impossible, to do manually and thus, it is desirable to put the logic for performing such an operation in a separate, dedicated application which can be invoked automatically. Frameworks such as VSS already support such automation by providing application program interfaces (APIs) for storage vendors to implement these operations.

Error recovery is an important issue in developing such a backup application. If during a backup operation using copy services, the application detects an error condition, all modifications performed so far by the storage controller during the backup operation need to be rolled back. Otherwise, the resources created so far would be wasted. In particular, the following error conditions need to be detected and recovered from:

1) a transient condition in the storage controller, such as lack of sufficient resources, e.g., not enough free storage space for target volumes, that makes continuing the copying operation impossible or generates an incomplete copy;
2) a transient condition in the client machine, e.g., operating system or application was not able to guarantee the consistency of the data, that requires the backup operation to be aborted;
3) communication to the storage controller is lost;
4) application host crashes; and
5) storage controller crashes.

Currently, these types of error recovery operations are implemented in the backup client application and usually are done by keeping a list of all the changes made in the storage controller and rolling back these changes. This approach has the following disadvantages:

1) recovery code is being replicated in every instance of the backup client application making code maintenance difficult. Moreover, every solution developer is forced to spend time and resources in providing a new backup client application with every product;
2) this approach is not easy to automate and is difficult to administer. In the case of a storage controller crash or loss of communication by the client machine, for example, the backup client application cannot rollback changes immediately. This has to be done manually when the storage controller comes back online. To make the recovery automatic, the backup client application has to take care of this situation as well, which requires maintaining the log for a longer duration until the storage controller restarts; and
3) if the backup client application host crashes during a backup operation, no recovery is possible until the host system reboots. Until recovery code is executed, the storage resources are locked up and not available for other client machines. This can have a significant impact if resources are shared among multiple clients in a rolling fashion. For example, the same storage space may be used for backing up data (and then moving the data to a tape device) from several host systems one after the other. In this scenario, a crashed host system which does not reboot immediately may prevent other client machines from backing up their data.

SUMMARY

The illustrative embodiments provide a system and method for error recovery in backup applications. The mechanisms of the illustrative embodiments move away from the application centric error recovery model of known backup solutions and instead implement a centralized error recovery feature for backup operations in the storage controllers themselves. As a result, there is no repetition of code since error recovery is done centrally in the storage controllers for every client machine.

Moreover, if the client machine crashes during a backup operation, the storage controller may roll back the changes made from that client machine and may reclaim the resources. The storage controller may start reclaiming resources when its communication subsystem notifies the storage controller that the network connection to the client machine is lost. In addition, if the storage controller fails or crashes during a backup operation, the storage controller itself may reverse the changes made and reclaim all the resources the next time it comes back online.

Furthermore, the illustrative embodiments make development of backup solutions easy by making error recovery a function of the storage controller itself rather than client applications. As a result, backup applications do not have to maintain a record of changes made to effect error recovery. This makes backup application development faster and developers can spend valuable resources addressing other issues such as how to guarantee data consistency during a backup operation.

In accordance with the illustrative embodiments, a system, method, and computer program product for error recovery of backup applications are provided that utilize error recovery logic provided in the storage controller itself. With the illustrative embodiments, error recovery logic is provided in the storage controller for generating and maintaining error recovery logs for one or more backup operations of one or more backup applications running on one or more host systems. The backup applications may utilize an established set of commands/application program interface (API) function calls to invoke the error recovery logic on the storage controller. At the initiation of the backup operation, the storage controller assigns a unique identifier to the backup operation and returns this identifier to the backup application. The backup application may then use this identifier to initiate error recovery operations or commit changes made during the backup operation via the storage controller. Thus, the storage controller offloads the burden of error recovery from the backup applications.

As mentioned above, the illustrative embodiments provide three new commands or API functions: START BACKUP, ABORT<identifier>, and COMMIT<identifier>. Backup applications that wish to use the functionality of the illustrative embodiments call the START BACKUP command/API. Upon receiving this command/API function call from a client machine, the storage controller starts a new log record for this backup operation and a unique identifier is returned to the client machine. The log record is kept in persistent storage and is preserved during storage controller failures.

The client backup application then begins to execute a sub-sequence of commands to create target volumes, flash-copy resources, and the like. The storage controller makes a record of the objects created in the log record. At any time, if the client machine wishes to terminate the backup operation, the client backup application need only call the ABORT<identifier> command/API function with the unique ID that was returned to the client machine. Upon receiving this command, the storage controller locates the log record using the unique identifier provided in the ABORT<identifier> command/API function call and rolls back the operations in the log record. Once all of the operations are reversed and all the resources reclaimed, the storage controller deletes the log record from persistent storage.

If the client backup application wishes to make the changes persistent, i.e. complete the backup operations successfully, the client backup application calls the COMMIT<identifier> command/API function with the appropriate unique identifier. Upon receiving this command, the storage controller deletes the log record associated with the unique identifier from the persistent storage. All changes made from the client backup application are now persistent and cannot be reversed using the mechanisms of the illustrative embodiments.

After starting a new backup operation using the START BACKUP command/API function, if the storage controller ever looses access to the client machine, either due to the client machine crashing, the client backup application crashing, etc., the storage controller may automatically reverse all changes made so far in the backup operation. The storage controller itself may perform such reversals of changes made by incomplete backup operations and thus, this functionality does not need to be provided in each individual client backup application. Moreover, such reversal or rollback of changes may be performed virtually immediately upon detecting the loss of access to the client since the reversal is performed in the storage controller itself and is not dependent upon a client backup application running on the client machine. As a result, resources may be recovered prior to rebooting of the client machine in the event of a failure.

In one illustrative embodiment, a computer program product comprising a computer useable medium having a computer readable program is provided. When the computer readable program is executed on a computing device, the computer readable program may cause a storage controller of a storage system to receive a request, from a backup application executing on a host system, to initiate a backup operation on data associated with one or more application instances executing on the host system and generate one or more error recovery data structures maintained in the storage system. The computer readable program may further cause the storage controller to determine if an error recovery operation is to be performed for the backup operation, invoke an error recovery operation for the backup operation, the error recovery operation being provided by logic of the storage controller, and perform the error recovery operation, in the storage controller, using the one or more error recovery data structures maintained in the storage system.

The computer readable program may cause the storage controller to determine if an error recovery operation is to be performed for the backup operation by determining if a failure of the backup operation has occurred. The failure of the backup operation may be a loss of communication between the backup application on the host system and the storage system. The computer readable program may cause the storage controller to determine if a failure of the backup operation has occurred by receiving a command or application program interface function call, from the backup application executing on the host system, to initiate performance of error recovery operations provided by logic of the storage controller. The error recovery operations may be performed in response to receiving the command or application program interface function call from the backup application executing on the host system.

The application program interface function call may be an ABORT application program interface function call specifying an identifier associated with the backup operation. The ABORT application program interface function may use objects created as part of the backup operation, as identified by the one or more error recovery data structures maintained in the storage system, to roll back changes made during the backup operation.

The computer readable program may cause the storage controller to determine if an error recovery operation is to be performed for the backup operation without invoking error recovery operations of the host system's backup application. The one or more error recovery data structures may comprise an error recovery log data structure that logs operations performed and objects created during the backup operation. The error recovery log data structure may be associated with the backup operation by a unique identifier assigned to the backup operation by the storage controller at initiation of the backup operation. The computer readable program may cause the storage controller to perform error recovery by rolling back changes made during the backup operation using the error recovery log data structure.

The computer readable program may cause the storage controller to initiate the backup operation by calling a START BACKUP application program interface (API) function provided by logic of the storage controller for starting a backup operation. The START BACKUP API may cause the storage controller to generate an error recovery log data structure for the backup operation, assign a unique identifier to the backup operation, and return the unique identifier to the backup application. The unique identifier may be used by the backup application to identify a particular backup operation in communications with the storage controller.

A plurality of host systems may utilize the storage system to backup application data. Performing error recovery in the storage controller may free resources utilized by the backup operation on the host system for use by other host systems prior to executing recovery logic in the host system.

In another illustrative embodiment, a method in a storage controller of a storage system is provided. The method may comprise receiving a request, from a backup application executing on a host system, to initiate a backup operation on data associated with one or more application instances executing on the host system. The method may further comprise generating one or more error recovery data structures maintained in the storage system, determining if an error recovery operation is to be performed for the backup operation. Moreover, the method may comprise invoking an error recovery operation for the backup operation, the error recovery operation being provided by logic of the storage controller. The method may further comprise performing the error recovery operation, in the storage controller, using the one or more error recovery data structures maintained in the storage system.

Determining if an error recovery operation is to be performed for the backup operation may comprise determining if a failure of the backup operation has occurred. The failure of the backup operation may be a loss of communication between the backup application on the host system and the storage system. Determining if a failure of the backup operation has occurred may comprise receiving a command or application program interface function call, from the backup application executing on the host system, to initiate performance of error recovery operations provided by logic of the storage controller. The error recovery operations may be performed in response to receiving the command or application program interface function call from the backup application executing on the host system.

The application program interface function call may be an ABORT application program interface function call specifying an identifier associated with the backup operation. The ABORT application program interface function may use objects created as part of the backup operation, as identified by the one or more error recovery data structures maintained in the storage system, to roll back changes made during the backup operation. Determining if an error recovery operation is to be performed for the backup operation may comprise determining if an error recovery operation is to be performed without invoking error recovery operations of the host system's backup application.

The one or more error recovery data structures may comprise an error recovery log data structure that logs operations performed and objects created during the backup operation. The error recovery log data structure is associated with the backup operation by a unique identifier assigned to the backup operation by the storage controller at initiation of the backup operation. The storage controller may perform error recovery by rolling back changes made during the backup operation using the error recovery log data structure.

Initiating the backup operation may comprise calling a START BACKUP application program interface (API) function provided by logic of the storage controller for starting a backup operation. The START BACKUP API may cause the storage controller to generate an error recovery log data structure for the backup operation, assign a unique identifier to the backup operation, and return the unique identifier to the backup application. The unique identifier may be used by the backup application to identify a particular backup operation in communications with the storage controller.

A plurality of host systems utilize the storage system to backup application data. Performing error recovery in the storage controller may free resources utilized by the backup operation on the host system for use by other host systems prior to executing recovery logic in the host system.

In another illustrative embodiment, a storage controller is provided that comprises a processor and a memory coupled to the processor. The memory may comprise instructions which, when executed by the processor, cause the processor to perform various ones, and combinations of, the operations outlined above with regard to the method illustrative embodiment.

In yet another illustrative embodiment, a system is provided that comprises a host system and a storage system coupled to the host system. The storage system may include a storage controller. The storage controller may receive a request, from a backup application executing on the host system, to initiate a backup operation on data associated with one or more application instances executing on the host system. The storage controller may further generate one or more error recovery data structures maintained in the storage system and determine if an error recovery operation is to be performed for the backup operation. Moreover, the storage controller may invoke an error recovery operation for the backup operation, the error recovery operation being provided by logic of the storage controller, and perform the error recovery operation, in the storage controller, using the one or more error recovery data structures maintained in the storage system. The storage controller may determine if an error recovery operation is to be performed for the backup operation without invoking error recovery operations of the host system's backup application.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE ILLUSTRATIVE EMBODIMENTS

The illustrative embodiments set forth herein provide mechanisms for error recovery of backup applications by implementing error recovery functionality in the storage controller of a storage system. The storage system and its associated host system or systems may be local to one another or may be remotely located from one another and accessible via one or more data networks. Thus, the storage system may be topologically and/or geographically remotely located, i.e. not within the same storage area network or cluster, from a host system running application instances that utilize or otherwise operate on data stored in the storage system. As such, the mechanisms of the illustrative embodiments may be implemented in a stand alone data processing system or a distributed data processing environment.

Figure 1:
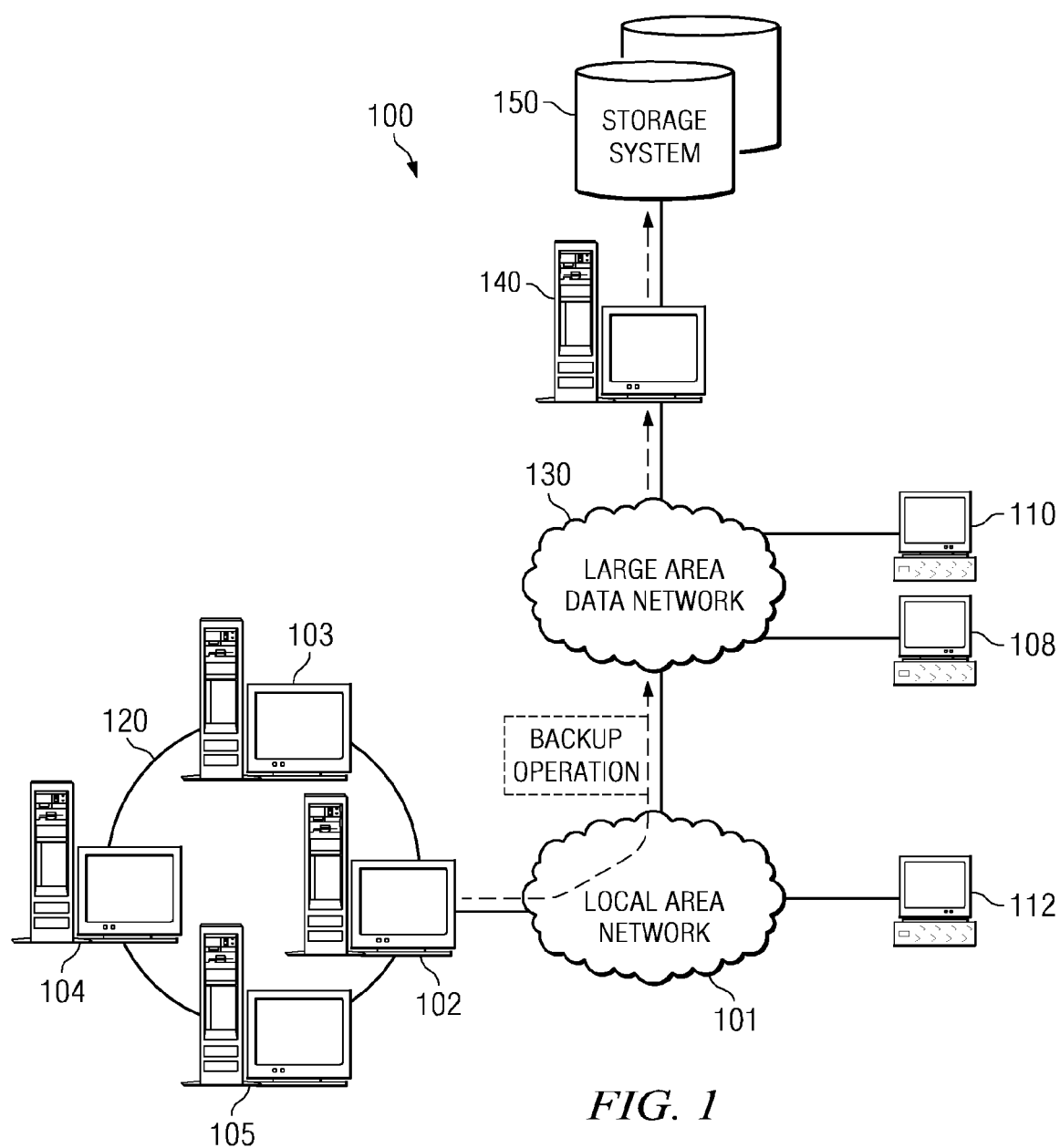
FIG. 1 is an exemplary block diagram of a distributed data processing system in which exemplary aspects of the illustrative embodiments may be implemented.
Figure 2:
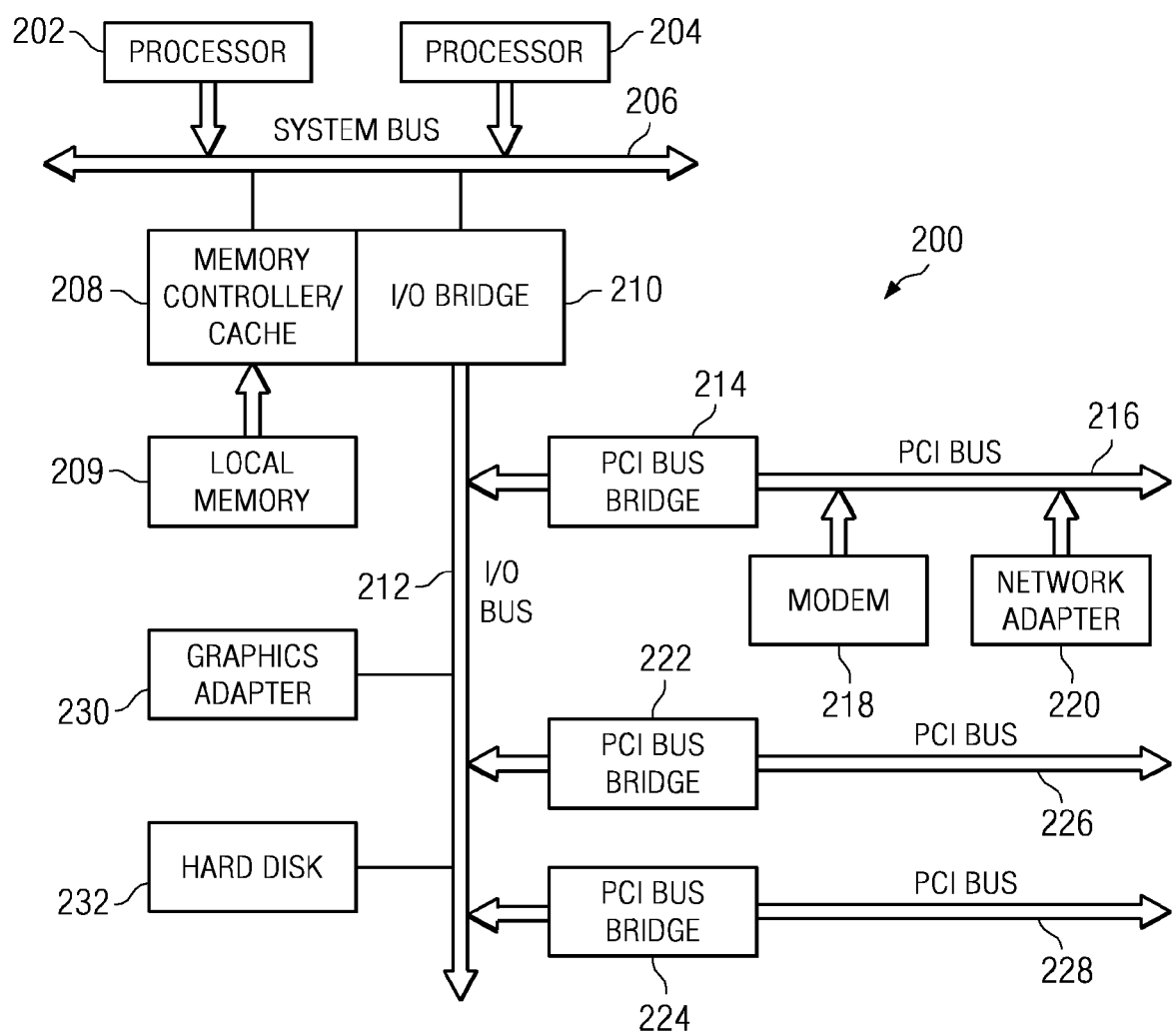
FIG. 2 is an exemplary block diagram of a server computing device in which exemplary aspects of the illustrative embodiments may be implemented.

In the following description, the mechanisms of the illustrative embodiments will be described in terms of a distributed data processing environment in which there are a plurality of data processing systems provided that may communicate with one another via one or more networks and communication links. FIGS. 1 and 2 provide examples of data processing environments in which aspects of the illustrative embodiments may be implemented. The depicted data processing environments are only exemplary and are not intended to state or imply any limitation as to the types or configurations of data processing environments in which the exemplary aspects of the illustrative embodiments may be implemented. Many modifications may be made to the data processing environments depicted in FIGS. 1 and 2 without departing from the spirit and scope of the present invention.

With reference now to the figures, FIG. 1 depicts a pictorial representation of a network of data processing systems 100 in which the present invention may be implemented. The network data processing system 100 contains a local area network (LAN) 101 and a large area data network 130, which are the media used to provide communication links between various devices and computers connected together within network data processing system 100. The LAN 101 and large area data network 130 may include connections, such as wired communication links, wireless communication links, fiber optic cables, and the like.

In the depicted example, the server computing devices 102-105 are connected to the LAN 101. The server computing devices 102-105 may comprise a storage area network (SAN) or a server cluster 120, for example. SANs and server clusters are generally well known in the art and thus, a more detailed explanation of SAN/cluster 120 is not provided herein.

In addition to server computing devices 102-105, client 112 is connected to LAN 101. Clients 108 and 110 are connected to the large area data network 130. These clients 108, 110, and 112 may be, for example, personal computers, workstations, application servers, or the like. In the depicted example, server computing devices 102-105 may store, track, and retrieve data objects for clients 108, 110 and 112. The clients 108, 110, and 112 are clients to server computing devices 102-105 and thus, may communication with the server computing devices 102-105 via the LAN 101 and/or the large area data network 130 to run applications and interface with running applications on the server computing devices 102-105 and obtain data objects from these server computing devices 102-105. The network data processing system 100 may include additional servers, clients, and other devices not shown.

The large area data network 130 is coupled to the LAN 101. In the depicted example, the large area data network 130 may be the Internet, representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages.

Of course, the large area data network 130 may also be implemented as a number of different types of networks, such as for example, an intranet, another local area network (LAN), a wide area network (WAN), or the like. FIG. 1 is only intended as an example, and is not intended to state or imply any architectural limitations for the illustrative embodiments described herein.

It should be noted that the Internet is typically used by servers in a cluster to communicate with one another using TCP/IP for messaging traffic. Storage controllers participating in backup operations typically communicate over a separate storage network using FICON channel commands, SCSI commands, or TCP/IP.

Server computing device 140 is coupled to large area data network 130 and has an associated storage system 150. The storage system 150 is shown as being directly coupled to the server computing device 140 but, alternatively, may be indirectly accessed by the server computing device 140 via the large area data network 130 or another network (not shown). In the depicted example, server computing device 140 is topologically remotely located from the SAN/cluster 120. That is, server computing device 140 is not part of the SAN/cluster 120. Moreover, the server computing device 140 may be geographically remotely located from the SAN/cluster 120.

Referring now to FIG. 2, a block diagram of a data processing system that may be implemented as a client computing device or server computing device, such as one or more of server computing devices 102-105 or server computing device 140 in FIG. 1, is depicted in accordance with a preferred embodiment of the present invention. The data processing system 200 may be a symmetric multiprocessor (SMP) system including a plurality of processors 202 and 204 connected to system bus 206. Alternatively, a single processor system may be employed. Also connected to the system bus 206 is memory controller/cache 208, which provides an interface to local memory 209. An I/O Bus Bridge 210 is connected to the system bus 206 and provides an interface to the I/O bus 212. A memory controller/cache 208 and I/O Bus Bridge 210 may be integrated as depicted.

A peripheral component interconnect (PCI) bus bridge 214 connected to the I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 and/or other network coupled devices may be provided through modem 218 and/or network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Referring again to FIG. 1, with the mechanism of the illustrative embodiments, it is desirable to provide high availability and disaster recovery for application instances running on one or more of the server computing devices 102-105 of the SAN/cluster 120. In order to provide such high availability and disaster recovery, data and state information associated with a particular application instance may be periodically backed up to provide a point in time to which the application instance may be restored in the event of a failure of the application instance, the computing device upon which the application instance is running, or other data network infrastructure elements that may cause the application instance to no longer operate properly.

It may sometimes be the case that a failure may occur during a backup operation or the backup operation may need to be terminated prematurely due to data consistency problems. For example, communication between a storage system and the client or server computing device (collectively referred to herein as the "host system"), or between a backup application running on the host system and the storage system, may be lost due to any of a number of different types of failures. In such cases, the mechanisms of the illustrative embodiments provide functionality within the storage controller of the storage system to reverse the backup operation without having to invoke error recovery logic of the host system's backup application to perform such reversal operations.

That is, a system, method, and computer program product for error recovery of backup applications are provided that utilize error recovery logic provided in the storage controller itself. With the illustrative embodiments, error recovery logic is provided in the storage controller for generating and maintaining error recovery logs for one or more backup operations of one or more backup applications running on one or more host systems. The backup applications may utilize an established set of commands/API function calls to invoke the error recovery logic on the storage controller. At the initiation of the backup operation, the storage controller assigns a unique identifier to the backup operation and returns this identifier to the backup application. The backup application may then use this identifier to initiate error recovery operations or commit changes made during the backup operation via the storage controller.

In this way, the mechanisms of the illustrative embodiments allow changes made due to the execution of the backup application on the host system to be rolled back immediately and automatically even in the event that communication between the backup application, or the host system, and the storage system is lost. Moreover, the mechanisms of the illustrative embodiments do not need to wait for recovery code to be executed on the host system. As a result, resources locked up by the backup application running on the host system may be recovered immediately without having to wait for the recovery code to be executed. This can have a significant impact if resources are shared among multiple host systems, such as in a rolling fashion, for example. For example, if the same storage space in the storage system is used for backing up data from several host systems one after the other, a crashed host system which does not reboot immediately may prevent other host systems from backing up their data. With the mechanisms of the illustrative embodiments, such problems are eliminated.

Figure 3:
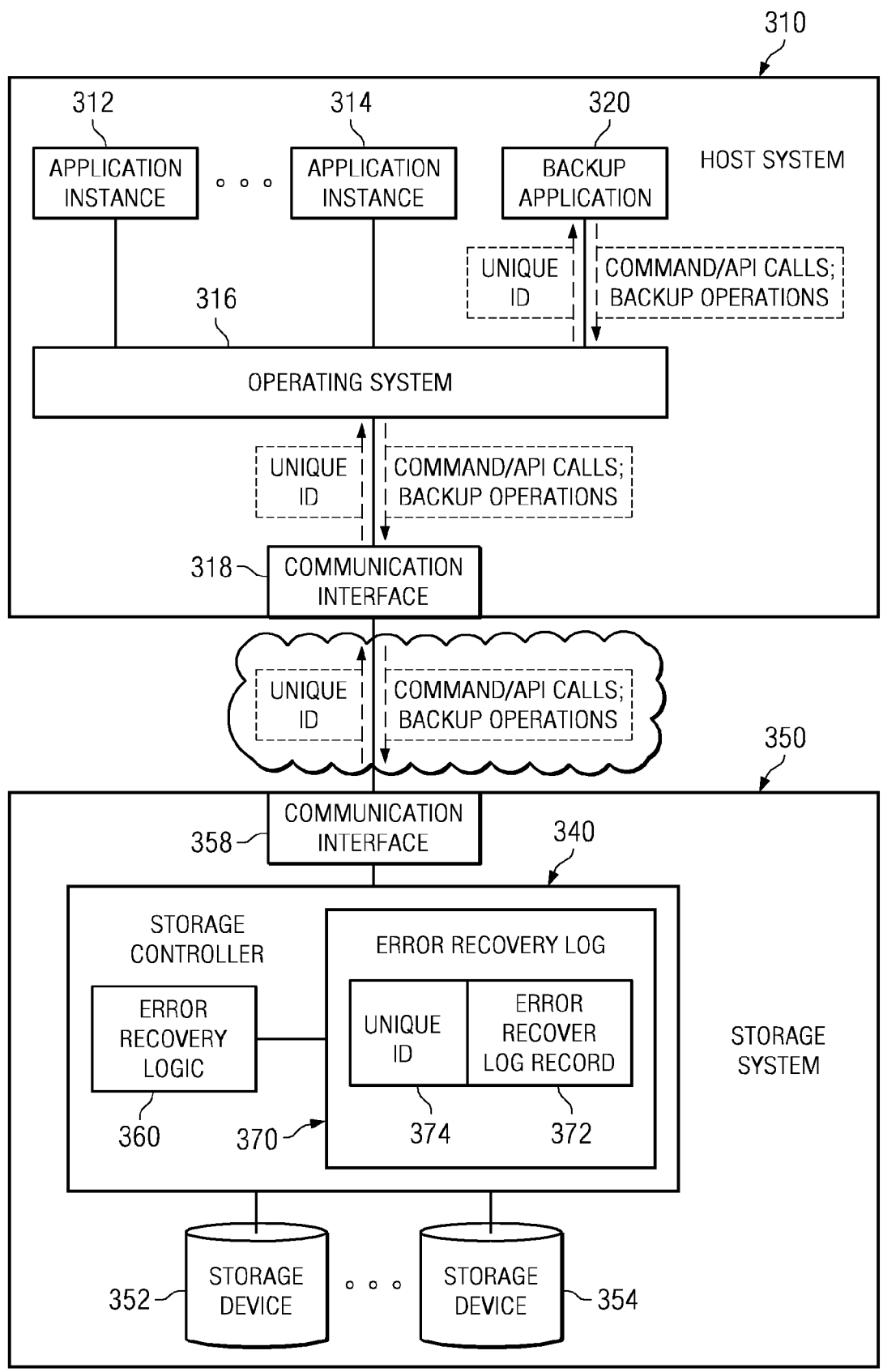
FIG. 3 is an exemplary block diagram illustrating the interaction of primary operational components during a backup operation in accordance with one illustrative embodiment.

FIG. 3 is an exemplary block diagram illustrating the interaction of primary operational components during a backup operation in accordance with one illustrative embodiment. As shown in FIG. 3, a plurality of application instances 312-314 execute on a host system 310, which may be a server data processing system, client data processing system, or the like. The application instances 312-314 may store application data to one or more storage devices 352-354 of a storage system 350 via their operating system 316, communication interface 318, one or more data networks, and storage controller 340 of the storage system 350.

In addition to the application instances 312-314, the host system 310 further executes a backup application 320 for invoking the backup logic built into the storage controller 340. The backup application 320 performs backup operations such as creating target storage areas for application data, creating consistency objects, creating backup copy objects, and initiating the actual copying of data to generate the backup.

The backup application 320 further performs command or API function calls to the storage controller 320 to thereby invoke the error recovery functionality provided in logic provided in the storage controller 340 itself. The backup application 320 may make such invocations in response to user input, scheduled tasks, or any other manual or automated input to initiate, abort, or commit a backup operation.

As mentioned above, in accordance with the mechanisms of the illustrative embodiments, the storage controller 340 comprises error recovery logic 360 for handling error recovery of a backup operation in the event of a failure or error during a backup operation initiated by the backup application 320. It should be appreciated that the storage controller 340 and the error recovery logic 360 may be implemented in software, firmware, or hardware, or any combination of software, firmware, or hardware. In one illustrative embodiment, the storage controller 340 is implemented as software instructions executed by one or more data processing devices.

The error recovery logic 360 creates and maintains recovery log data structures 370 within the storage controller 340 itself and, in the event of an error or failure during the backup operation, uses these recovery log data structures 370 to reverse or roll back changes made during the backup operation. In some illustrative embodiments, the recovery log data structures 370 may alternatively be stored in a designated portion of the storage system 350, such as in a specified portion of storage device 352, for example.

The illustrative embodiments provide three new commands or application program interface (API) functions that may be invoked on the storage controller 340 by the backup application 320 running on the host system 310: START BACKUP, ABORT<identifier>, and COMMIT<identifier>. When the backup application 320 determines to use the error recovery functionality of the storage controller 340 that wish to use the functionality of the illustrative embodiments, the backup application 320 calls the START BACKUP command/API. The START BACKUP command/API is sent to the storage controller 340 from the backup application 320 via the operating system 316, the communication interface 318, and the one or more data networks.

Upon receiving this command/API function call from a backup application 320 executing on the host system 310, the storage controller 340 associated with the storage system 350 with which the host system 310 communicates starts a new log record 372 in the recovery log data structures 370 for this backup operation. Moreover, the storage controller 340 assigns and returns a unique identifier to the backup application 320 on the host system 310 for the backup operation. The unique identifier is associated with the log record 372 corresponding to the backup operation and is used as a basis for correlating the log record 372 with the objects and events generated during the backup operation. The log record 372 is kept in persistent storage and is preserved during storage controller 340 failures.

The backup application 320 may then begin to execute a sub-sequence of commands to create target volumes, flash-copy resources, and the like, to perform the backup operation. The storage controller 340 makes a record of the objects created during the backup operation in the log record 372. At any time, if the backup application 320 determines that the backup operation should be terminated, the backup application 320 need only call the ABORT<identifier> command/API function with the unique ID that was returned to the client machine.

Alternatively, if communication between the host system 310 and the storage system 350 is lost, or between the backup application 320 and the storage system 350 is lost, a timeout condition may cause the ABORT<identifier> command/API function to be invoked automatically within the storage controller 340 for the backup operation. Moreover, in embodiments where the host system 310 and the storage system 350 utilize a connection oriented protocol, where a networking subsystem monitors the state of the connection by sending special data between communication endpoints, i.e. the host system 310 and the storage system 350, this loss of communication can be detected as soon as the host system 310 side of the communication goes down, i.e. is unable to communicate data across the connection.

Upon receiving the ABORT<identifier> command, the storage controller 340 locates the log record 372 in the recovery log data structures 370 using the unique identifier provided in the ABORT<identifier> command/API function call. This identifier is the unique identifier returned from the storage controller 340 to the backup application 320 when the backup application 320 called the START BACKUP command/API function and is unique to the backup operation.

Having located the log record 372 in the recovery log data structures 370, the storage controller 340 reverses or rolls back the operations recorded in the log record 372 utilizing the objects generated by the backup operation as specified in the log record 372. Resources utilized by the backup operation are also reclaimed by the storage controller 340 using the information stored in the log record 372. The rolling back of backup changes and reclaiming of resources is generally known in the art and thus, a detailed description of these operations is not provided herein. Once all of the operations are reversed and all the resources reclaimed, the storage controller 340 may delete the log record 372 from persistent storage.

If the backup application 320 wishes to make the changes persistent, i.e. complete the backup operations successfully, the backup application 320 calls the COMMIT<identifier> command/API function with the appropriate unique identifier for the backup operation. Upon receiving this command, the storage controller 340 deletes the log record 372 associated with the unique identifier from the recovery log data structures 370 in persistent storage, or at least marks the log record 372 for deletion such that the space may be reclaimed at a later time. As a result, all changes made by the backup application 320 are now persistent and cannot be reversed using the mechanisms of the illustrative embodiments.

As mentioned above, if, after starting a new backup operation using the START BACKUP command/API function, the storage controller 340 ever looses access to the host system 310, either due to the host system 310 crashing, the backup application 320 crashing, etc., the storage controller 340 may automatically reverse all changes made so far in the backup operation using the log record 372. The storage controller 340 itself may perform such reversals of changes made by incomplete backup operations and thus, this functionality does not need to be provided in each individual backup application 320. Moreover, such reversal or rollback of changes may be performed virtually immediately upon detecting the loss of access to the host system 310 since the reversal is performed in the storage controller 340 itself and is not dependent upon the backup application 320 running on the host system 310. As a result, resources may be recovered prior to rebooting of the host system 310 in the event of a failure.

The mechanisms of the illustrative embodiment place the burden of error recovery on logic provided within the storage controller 340 itself rather than requiring that each individual backup application 320 provide such functionality. As a result, developers need not account for such error recovery when developing backup applications 320 and may simply utilize the command/API function calls provided by the mechanisms of the illustrative embodiments.

Moreover, because the storage controller 340 handles error recovery, the operations of the backup application 320 are greatly simplified over the operation of known backup applications 320. For example, assume that a backup operation, using the FlashCopy mechanism available from International Business Machines Corporation of Armonk, N.Y., is implemented and used to backup four source volumes in the storage system 350. Further assume that, towards the end of the backup operation, the backup application 320 determines that the backup operation needs to be aborted because, for example, the operating system or another application indicates that the backed up data may not be consistent due to some transient condition, e.g., one participating application instance 312 whose data is being backed up did not de-stage data from memory into the disk in time resulting in inconsistent backup volumes. A known backup application implementation may comprise performing the following operations:

1) create a first target logical unit number (LUN), if a SCSI based storage system is being utilized, for source LUN1;
2) save the name of the first target LUN in a recovery log data structure in the host system;
3) create a second target LUN for source LUN2;
4) save the name of the second target LUN in the recovery log data structure in the host system;
5) create a third target LUN for source LUN3;
6) save the name of the third target LUN in the recovery log data structure in the host system;
7) create a fourth target LUN for source LUN3;
8) save the name of the fourth target LUN in the recovery log data structure in the host system;
9) create a consistency object for the backup operation;
10) save the name of the consistency object in the recovery log data structure in the host system;
11) create first flashcopy object for (source1, target1) pair;
12) save the name of the first flashcopy object in the recovery log data structure in the host system;
13) create second flashcopy object for (source2, target2) pair;
14) save the name of the second flashcopy object in the recovery log data structure in the host system;
15) create third flashcopy object for (source3, target3) pair;
16) save the name of the third flashcopy object in the recovery log data structure in the host system;
17) create fourth flashcopy object for (source4, target4) pair;
18) save the name of the fourth flashcopy object in the recovery log data structure in the host system;
19) start flashcopy (source1, target1);
20) start flashcopy (source2, target2);
21) backup application determines to abort the backup operation and start error recovery;
22) delete consistency object;
23) delete flashcopy object (source1, target1);
24) delete flashcopy object (source2, target2);
25) delete flashcopy object (source3, target3);
26) delete flashcopy object (source4, target4);
27) delete target1 LUN;
28) delete target2 LUN;
29) delete target3 LUN; and
30) delete target4 LUN.

The error recovery referenced in step 21 above may be performed in a number of different ways depending upon the particular implementation used by the storage controller. These details may depend, for example, upon how the storage controller implements a point-in-time copy feature. Of particular importance to the illustrative embodiments, it should be noted that all of the changes made during the backup operation will be completely reversed by the storage controller when the point-in-time objects, e.g., flashcopy objects, are deleted. In the above series of steps, the 'delete' operation refers to the set of actions that the storage controller initiates in response to a client sending a delete command. For example, upon a failure, the backup application will initiate a delete command. Upon receiving this command the storage controller will initiate a set of internal operations that delete the point-in-time objects and reclaim the resources. With the illustrative embodiments of the present invention, however, the backup error recovery module, which resides within the storage controller, will invoke these actions directly when it decides to ABORT an ongoing backup operation.

That is, with the mechanisms of the illustrative embodiments, this sequence of operations performed by the backup application is greatly simplified by providing the error recovery logic in the storage controller 340 itself. In order to perform the same actions as outlined above with regard to the known backup application solution, the mechanisms of the illustrative embodiments need only perform the following operations:

1) call START BACKUP;
2) save the unique identifier assigned by the storage controller for this backup operation;
3) create first target LUN for source LUN1;
4) create second target LUN for source LUN2;
5) create third target LUN for source LUN3;
6) create fourth target LUN for source LUN4;
7) create a consistency object for the backup operation;
8) create a first flashcopy object for (source1, target1) pair;
9) create a second flashcopy object for (source2, target2) pair;
10) create a third flashcopy object for (source3, target3) pair;
11) create a fourth flashcopy object for (source4, target4) pair;
12) start flashcopy (source1, target1);
13) start flashcopy (source2, target2);
14) backup application determines to abort the backup operation and start error recovery; and
15) call ABORT<identifier> to abort backup operation and begin error recovery operations in the storage controller 340.

In the above sequence of operations, the storing of the names for the various backup objects, i.e. the consistency objects, flashcopy objects, etc., is performed by the storage controller 340. Moreover, the ABORT operations are performed within the storage controller 340, e.g., deletion of objects and other roll back operations. This greatly simplifies the operation of the backup application 320 running on the host system 310. As a result, developers of backup applications 320 need not include functionality for maintaining recovery logs, updating recovery logs, and performing roll back operations in the event of a failure in their backup applications 320. They need only implement the command/API function calls for invoking such operations on the storage controller 340 which then handles such operations with its built-in error recovery logic 360.

Figure 4:
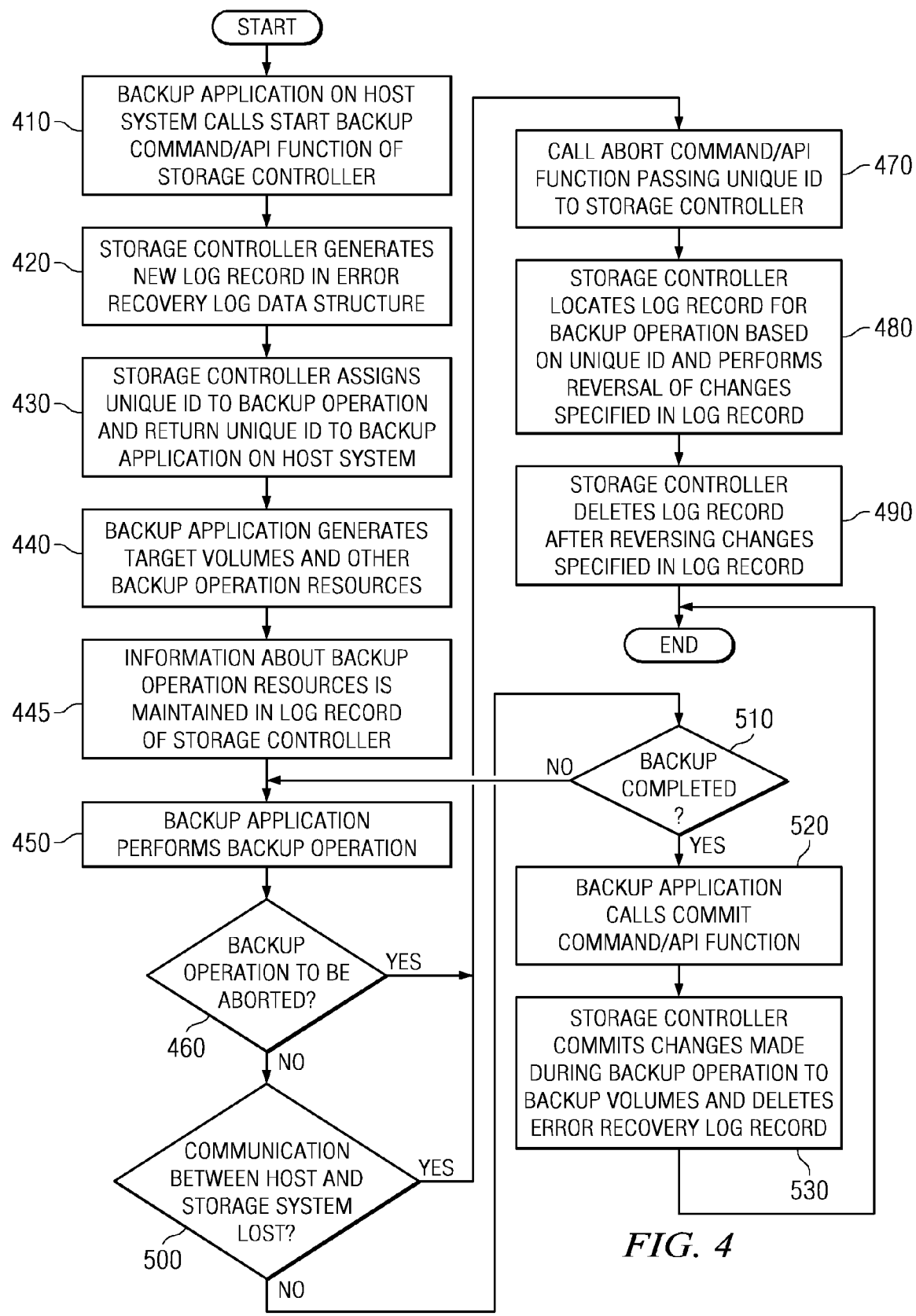
FIG. 4 is a flowchart outlining an exemplary operation for performing error recovery during a backup operation in accordance with one illustrative embodiment.

FIG. 4 is a flowchart outlining an exemplary operation for performing error recovery during a backup operation in accordance with one illustrative embodiment. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

As shown in FIG. 4, the operation starts with a backup application running on a host system calling the START BACKUP command/API function (step 410). In response to the START BACKUP command/API function call being received in the storage controller, the storage controller generates a new log record in its associated error recovery log data structures, which may be stored in persistent storage internal to the storage controller or in a designated location of the storage devices coupled to the storage controller (step 420). The storage controller further assigns a unique identifier to the backup operation and returns that unique identifier to the backup application in the host system (step 430).

The backup application on the host system may then generate target volumes, e.g., LUNs, flashcopy resources, e.g., flashcopy objects, and the like, required for performing the backup operation (step 440). Information, e.g., names and the like, about the particular volumes, objects, and other backup operation resources generated as part of the backup operation may be maintained in the log record for the backup operation (step 445). The backup application then begins performing the backup operation, e.g., performs flashcopy operations for copying source volumes to target volumes (step 450).

A determination is made by the backup application if the backup operation should be aborted (step 460). If so, the backup application calls the ABORT command/API function to initiate error recovery operations in the storage controller and passes the unique identifier that was assigned to the backup operation (step 470). The storage controller then locates the appropriate error recovery log record based on the unique identifier and performs a reversal or roll back of the changes specified in the error recovery log record (step 480). Once the operations specified in the error recovery log record for the backup operation are reversed and the resources reclaimed, the error recovery log record is deleted from the error recovery log data structure (step 490).

If the backup operation is not to be aborted, a determination is made by the storage controller as to whether communication between the host system and the storage system has been lost (step 500). If so, the operation branches to step 470 where the storage controller itself calls the ABORT command/API function on itself for the backup operation and error recovery operations in steps 480-490 are invoked.

If the backup operation is not to be aborted, and communication between the host system and the storage system has not been lost, a determination is made by the backup application as to whether the backup operation has completed (step 510). If not, the operation returns to step 450 and continues the backup operation. If the backup operation has completed, the backup application may then call the COMMIT command/API function of the storage controller and may pass the unique identifier for the backup operation with the COMMIT command/API function call (step 520). In response to receiving the COMMIT command/API function call, the storage controller may then commit the changes made and logged in the error recovery log record and may delete the error recovery log record (step 530). The operation then terminates.

Thus, the illustrative embodiments provide mechanisms for performing error recovery of backup applications from within the storage controller itself. The mechanisms of the illustrative embodiments move away from the application centric error recovery model of known backup solutions and instead implement a centralized error recovery feature for backup operations in the storage controllers themselves. As a result, there is no repetition of code since error recovery is done centrally in the storage controllers for every host system coupled to the storage controllers.

Moreover, if the host system crashes during a backup operation, the storage controller may roll back the changes made from that host system and may reclaim the resources. The storage controller may start reclaiming resources when its communication subsystem notifies the storage controller that the network connection to the host system is lost. In addition, if the storage controller fails or crashes during a backup operation, the storage controller itself may reverse the changes made and reclaim all the resources the next time it comes back online.

Furthermore, the illustrative embodiments make development of backup solutions easy by making error recovery a function of the storage controller itself rather than backup applications running on the various host systems. As a result, backup applications do not have to maintain a record of changes made to effect error recovery. This makes backup application development faster and developers can spend valuable resources addressing other issues such as how to guarantee data consistency during a backup operation.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a computer useable medium having a computer readable program, wherein the computer readable program, when executed on a computing device, causes a storage controller of a storage system to:
   receive a request, from a backup application executing on a host system, to initiate a backup operation on data associated with one or more application instances executing on the host system;
   generate one or more error recovery data structures maintained in the storage system;
   determine if an error recovery operation is to be performed for the backup operation;
   invoke an error recovery operation for the backup operation, the error recovery operation being provided by logic of the storage controller; and
   perform the error recovery operation, in the storage controller, using the one or more error recovery data structures maintained in the storage system.

2. The computer program product of claim 1, wherein the computer readable program causes the storage controller to determine if an error recovery operation is to be performed for the backup operation by determining if a failure of the backup operation has occurred.

3. The computer program product of claim 2, wherein the failure of the backup operation is a loss of communication between the backup application on the host system and the storage system.

4. The computer program product of claim 2, wherein the computer readable program causes the storage controller to determine if a failure of the backup operation has occurred by receiving a command or application program interface function call, from the backup application executing on the host system, to initiate performance of error recovery operations provided by logic of the storage controller, wherein the error recovery operations are performed in response to receiving the command or application program interface function call from the backup application executing on the host system.

5. The computer program product of claim 4, wherein the application program interface function call is an ABORT application program interface function call specifying an identifier associated with the backup operation, and wherein the ABORT application program interface function uses objects created as part of the backup operation, as identified by the one or more error recovery data structures maintained in the storage system, to roll back changes made during the backup operation.

6. The computer program product of claim 1, wherein the computer readable program causes the storage controller to determine if an error recovery operation is to be performed for the backup operation without invoking error recovery operations of the host system's backup application.

7. The computer program product of claim 1, wherein the one or more error recovery data structures comprises an error recovery log data structure that logs operations performed and objects created during the backup operation, and wherein the error recovery log data structure is associated with the backup operation by a unique identifier assigned to the backup operation by the storage controller at initiation of the backup operation.

8. The computer program product of claim 7, wherein the computer readable program causes the storage controller to perform error recovery by rolling back changes made during the backup operation using the error recovery log data structure.

9. The computer program product of claim 1, wherein the computer readable program causes the storage controller to initiate the backup operation by calling a START BACKUP application program interface (API) function provided by logic of the storage controller for starting a backup operation.

10. The computer program product of claim 9, wherein the START BACKUP API causes the storage controller to:
    generate an error recovery log data structure for the backup operation;
    assign a unique identifier to the backup operation; and
    return the unique identifier to the backup application, wherein the unique identifier is used by the backup application to identify a particular backup operation in communications with the storage controller.

11. The computer program product of claim 1, wherein a plurality of host systems utilize the storage system to backup application data, and wherein performing error recovery in the storage controller frees resources utilized by the backup operation on the host system for use by other host systems prior to executing recovery logic in the host system.

12. A method, in a storage controller of a storage system, comprising:
    receiving a request, from a backup application executing on a host system, to initiate a backup operation on data associated with one or more application instances executing on the host system;
    generating one or more error recovery data structures maintained in the storage system;
    determining if an error recovery operation is to be performed for the backup operation;
    invoking an error recovery operation for the backup operation, the error recovery operation being provided by logic of the storage controller; and
    performing the error recovery operation, in the storage controller, using the one or more error recovery data structures maintained in the storage system.

13. The method of claim 12, wherein determining if an error recovery operation is to be performed for the backup operation comprises determining if a failure of the backup operation has occurred.

14. The method of claim 13, wherein the failure of the backup operation is a loss of communication between the backup application on the host system and the storage system.

15. The method of claim 13, wherein determining if a failure of the backup operation has occurred comprises receiving a command or application program interface function call, from the backup application executing on the host system, to initiate performance of error recovery operations provided by logic of the storage controller, wherein the error recovery operations are performed in response to receiving the command or application program interface function call from the backup application executing on the host system.

16. The method of claim 15, wherein the application program interface function call is an ABORT application program interface function call specifying an identifier associated with the backup operation, and wherein the ABORT application program interface function uses objects created as part of the backup operation, as identified by the one or more error recovery data structures maintained in the storage system, to roll back changes made during the backup operation.

17. The method of claim 12, wherein determining if an error recovery operation is to be performed for the backup operation comprising determining if an error recovery operation is to be performed without invoking error recovery operations of the host system's backup application.

18. The method of claim 12, wherein the one or more error recovery data structures comprises an error recovery log data structure that logs operations performed and objects created during the backup operation, and wherein the error recovery log data structure is associated with the backup operation by a unique identifier assigned to the backup operation by the storage controller at initiation of the backup operation.

19. The method of claim 18, wherein the storage controller performs error recovery by rolling back changes made during the backup operation using the error recovery log data structure.

20. The method of claim 12, wherein initiating the backup operation comprises calling a START BACKUP application program interface (API) function provided by logic of the storage controller for starting a backup operation.

21. The method of claim 20, wherein the START BACKUP API causes the storage controller to:
generate an error recovery log data structure for the backup operation;
assign a unique identifier to the backup operation; and
return the unique identifier to the backup application, wherein the unique identifier is used by the backup application to identify a particular backup operation in communications with the storage controller.

22. The method of claim 12, wherein a plurality of host systems utilize the storage system to backup application data, and wherein performing error recovery in the storage controller frees resources utilized by the backup operation on the host system for use by other host systems prior to executing recovery logic in the host system.

23. A storage controller, comprising:
a processor; and
a memory coupled to the processor, wherein the memory comprises instructions which, when executed by the processor, cause the processor to:
receive a request, from a backup application executing on a host system, to initiate a backup operation on data associated with one or more application instances executing on the host system;
generate one or more error recovery data structures maintained in the storage system;
determine if an error recovery operation is to be performed for the backup operation;
invoke an error recovery operation for the backup operation, the error recovery operation being provided by logic of the storage controller; and
perform the error recovery operation, in the storage controller, using the one or more error recovery data structures maintained in the storage system.

24. The storage controller of claim 23, wherein instructions cause the processor to determine if an error recovery operation is to be performed for the backup operation by determining if a failure of the backup operation has occurred.

25. The storage controller of claim 24, wherein the failure of the backup operation is a loss of communication between the backup application on the host system and the storage system.

26. The storage controller of claim 24, wherein the instructions cause the processor to determine if a failure of the backup operation has occurred by receiving a command or application program interface function call, from the backup application executing on the host system, to initiate performance of error recovery operations provided by logic of the storage controller, wherein the error recovery operations are performed in response to receiving the command or application program interface function call from the backup application executing on the host system.

27. The storage controller of claim 26, wherein the application program interface function call is an ABORT application program interface function call specifying an identifier associated with the backup operation, and wherein the ABORT application program interface function uses objects created as part of the backup operation, as identified by the one or more error recovery data structures maintained in the storage system, to roll back changes made during the backup operation.

28. The storage controller of claim 23, wherein the instructions cause the processor to determine if an error recovery operation is to be performed for the backup operation without invoking error recovery operations of the host system's backup application.

29. The storage controller of claim 23, wherein the one or more error recovery data structures comprises an error recovery log data structure that logs operations performed and objects created during the backup operation, and wherein the error recovery log data structure is associated with the backup operation by a unique identifier assigned to the backup operation by the storage controller at initiation of the backup operation.

30. The storage controller of claim 29, wherein the instructions cause the processor to perform error recovery by rolling back changes made during the backup operation using the error recovery log data structure.

31. The storage controller of claim 23, wherein the instructions cause the processor to initiate the backup operation by calling a START BACKUP application program interface (API) function provided by logic of the storage controller for starting a backup operation.

32. The storage controller of claim 31, wherein the START BACKUP API causes the processor to:
generate an error recovery log data structure for the backup operation;
assign a unique identifier to the backup operation; and
return the unique identifier to the backup application, wherein the unique identifier is used by the backup application to identify a particular backup operation in communications with the storage controller.

33. The storage controller of claim 23, wherein a plurality of host systems utilize the storage system to backup application data, and wherein performing error recovery in the storage controller frees resources utilized by the backup operation on the host system for use by other host systems prior to executing recovery logic in the host system.

34. A system, comprising:
a host system; and
a storage system coupled to the host system, the storage system including a storage controller, wherein the storage controller:
receives a request, from a backup application executing on the host system, to initiate a backup operation on data associated with one or more application instances executing on the host system;
generates one or more error recovery data structures maintained in the storage system;
determines if an error recovery operation is to be performed for the backup operation;

invokes an error recovery operation for the backup operation, the error recovery operation being provided by logic of the storage controller; and performs the error recovery operation, in the storage controller, using the one or more error recovery data structures maintained in the storage system.

35. The system of claim 34, wherein the storage controller determines if an error recovery operation is to be performed for the backup operation without invoking error recovery operations of the host system's backup application.

* * * * *